UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

PROCESS FOR MAKING CATALYZERS.

1,257,531. Specification of Letters Patent. Patented Feb. 26, 1918.

No Drawing. Original application filed November 11, 1912, Serial No. 730,746. Divided and this application filed May 6, 1915. Serial No. 26,305.

*To all whom it may concern:*

Be it known that I, WILLIAM D. RICHARDSON, a citizen of the United States of America, and a resident of Chicago, county of Cook, and State of Illinois, have invented certain new and useful Improvements in Processes for Making Catalyzers, of which the following is a specification.

This application is a division of my copending application Serial No. 730,746, filed November 11, 1912.

The object of this invention is to provide an improved method of hydrogenating oils or fats to harden or solidify them.

This object is accomplished by the following described process:

I first put in a suitable container a quantity of liquid or semi-liquid material, which may be water, and then submerge two metallic pieces in this material and connect them with a suitable device for supplying an electric current through said pieces. These pieces serve as electrodes, being suitably spaced apart and provided with sufficient current to produce an electric arc across the gap between them, and to cause part of the metal of said electrodes to disintegrate and to be diffused in finely divided form in said material. The material of electrodes suitable for this purpose may be nickel, copper, platinum, palladium, iron, or their alloys, or other metals or alloys. These electrodes may be conveniently used in the form of rods, and the electric current may be supplied by a hand feed or an automatic arc lamp mechanism in which the rods are clamped. The rods may be entirely or partly submerged in the material before mentioned. The electric current is operated preferably at a voltage of from 40 to 150, and is preferably a direct current.

The arc is allowed to continue until the desired amount of disintegrated or finely divided metal has been produced by its eroding action. The finely divided metal is then separated from the liquid or semi-liquid material, or from the greater part thereof, as may be done by filtering it out, or by evaporating the liquid, and the finely divided metal thus obtained is then introduced into the unsaturated compound, such as the fatty oil or fat to be hydrogenated, and is mixed therewith in the proportion of about 1 to 3 per cent. of the metal to the mixture, by weight. More or less may be used if desired. Hardening is effected by hydrogen or a gas containing hydrogen in any of the usual ways, preferably done under heat and pressure.

When operating under about 40 pounds pressure and with a temperature of about 160 degrees C., the process of hardening or solidifying may be completed in from one to eight hours, depending upon the percentage of the finely divided metal used, the kind of fat or oil being hardened, the rapidity of agitation, etc., and upon the degree of hardness desired. After the hydrogenation of the oil or fat has been accomplished, the finely divided metal may be removed from the mass as by settling, straining, or filtering.

I claim:

1. The process of producing catalytic material adapted for use in the hardening of fatty oils which comprises forming an arc between electrodes comprising nickel material and in the presence of a liquid medium, and in collecting the finely divided nickel-containing precipitate resulting from the eroding action of such arc.

2. The process of producing catalytic material adapted for use in hardening fatty oils which comprises passing an electric current of arc-forming strength between electrodes comprising nickel material and in the presence of a liquid medium and in collecting the finely divided nickel-containing precipitate resulting from the eroding action of said electric current.

3. The process of producing catalytic material adapted for use in the hardening of fatty oils which comprises subjecting a thick mass of nickel as an electrode to the action of an electric arc and in the presence of a liquid medium; whereby nickel of a substantially-colloidal form is obtained, and in collecting the precipitate resulting from the eroding action of such arc.

4. The process of producing catalytic material which comprises forming an arc between nickel electrodes in the presence of water and in collecting the finely divided nickel containing precipitate resulting from the eroding action of such arc.

5. The process of producing catalytic material which comprises forming an arc between nickel electrodes in the presence of a liquid medium and in collecting the finely divided nickel containing material resulting from the eroding action of such arc, in expelling the liquid medium therefrom and mixing the nickel material with oil.

Signed at Chicago this 20th day of April, 1915.

WILLIAM D. RICHARDSON.